US012613556B2

(12) United States Patent (10) Patent No.: US 12,613,556 B2
Kang et al. (45) Date of Patent: *Apr. 28, 2026

(54) FOLDABLE DISPLAY DEVICE

(71) Applicant: LG INNOTEK CO., LTD., Seoul (KR)

(72) Inventors: Sung Won Kang, Seoul (KR); Jae Seok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/018,223

(22) Filed: Jan. 13, 2025

(65) Prior Publication Data

US 2025/0147553 A1 May 8, 2025

Related U.S. Application Data

(63) Continuation of application No. 18/385,719, filed on Oct. 31, 2023, now Pat. No. 12,228,972, which is a (Continued)

(30) Foreign Application Priority Data

Dec. 30, 2019 (KR) ........................ 10-2019-0177882

(51) Int. Cl.
*G06F 3/041* (2006.01)
*G06F 1/16* (2006.01)
(52) U.S. Cl.
CPC .................................. *G06F 1/1652* (2013.01)
(58) Field of Classification Search
CPC .......... G09F 9/30; G09F 9/301; G06F 1/1652; G06F 2203/04102; G06F 2203/04105;
(Continued)

(56) References Cited

U.S. PATENT DOCUMENTS 8,804,347 B2 8/2014 Martisauskas
9,069,521 B2 6/2015 Lee et al.
(Continued)

FOREIGN PATENT DOCUMENTS

CN 109285459 1/2019
CN 110570762 12/2019
(Continued)

OTHER PUBLICATIONS

International Search Report dated Mar. 11, 2021 issued in Application No. PCT/KR2020/018441.
(Continued)

*Primary Examiner* — William Boddie
(74) *Attorney, Agent, or Firm* — KED & ASSOCIATES, LLP

(57) ABSTRACT

A display device according to an embodiment comprises: an elastic member; and at least one panel from among a display panel and a touch panel which are arranged on the elastic member, wherein the elastic member includes one surface and the other surface opposite to the one surface, the elastic member includes a first area and a second area, the first area is defined as a folding area, the second area is defined as an unfolding area, the elastic member has a plurality of first grooves arranged on the one surface in the first area thereof, and the panel is arranged on the other surface of the elastic member via an adhesive layer.

14 Claims, 6 Drawing Sheets

Related U.S. Application Data continuation of application No. 17/786,639, filed as application No. PCT/KR2020/018441 on Dec. 16, 2020, now Pat. No. 11,841,746.

(58) Field of Classification Search
CPC .......... G09G 2380/02; G02F 1/133305; H10K 77/111
See application file for complete search history.

(56) References Cited

U.S. PATENT DOCUMENTS

| | | | |
|---|---|---|---|
| 9,655,235 | B2 | 5/2017 | Hwang et al. |
| 10,164,208 | B2 | 12/2018 | Lee et al. |
| 10,558,242 | B2 | 2/2020 | Kim et al. |
| 11,132,027 | B2 | 9/2021 | Park et al. |
| 11,175,696 | B2 | 11/2021 | Cho |
| 11,455,014 | B2 | 9/2022 | Kim et al. |
| 11,703,912 | B2 | 7/2023 | Park et al. |
| 11,703,913 | B2 | 7/2023 | Park et al. |
| 11,841,746 | B2 | 12/2023 | Kang |
| 11,877,466 | B2 | 1/2024 | Kang |
| 11,977,414 | B2 | 5/2024 | Park |
| 12,197,255 | B2 * | 1/2025 | Park ...................... G06F 1/1656 |
| 12,228,972 | B2 * | 2/2025 | Kang ........................ G09F 9/30 |
| 2014/0029212 | A1 | 1/2014 | Hwang |
| 2014/0065326 | A1 | 3/2014 | Lee |
| 2014/0226275 | A1 | 8/2014 | Ko |
| 2014/0253830 | A1 | 9/2014 | Li et al. |
| 2014/0287213 | A1 | 9/2014 | Lee |
| 2015/0043174 | A1 | 2/2015 | Han |
| 2015/0241925 | A1 | 8/2015 | Seo et al. |
| 2016/0295685 | A1 | 10/2016 | Ryu |
| 2018/0097197 | A1 | 4/2018 | Han |
| 2018/0217639 | A1 | 8/2018 | Jones et al. |
| 2019/0025886 | A1 | 1/2019 | Ryu et al. |
| 2019/0196548 | A1 | 6/2019 | Kim et al. |
| 2019/0207141 | A1 | 7/2019 | Kim et al. |
| 2019/0302850 | A1 | 10/2019 | Park et al. |
| 2019/0346883 | A1 | 11/2019 | Kim et al. |
| 2021/0407329 | A1 | 12/2021 | Hu et al. |
| 2022/0011823 | A1 | 1/2022 | Park et al. |
| 2022/0011824 | A1 | 1/2022 | Park et al. |
| 2023/0018777 | A1 | 1/2023 | Park |
| 2023/0182433 | A1 | 6/2023 | Park |
| 2023/0266796 | A1 * | 8/2023 | Wu ...................... G06F 3/0443 345/174 |

FOREIGN PATENT DOCUMENTS

| | | |
|---|---|---|
| JP | 2014224919 | 12/2014 |
| KR | 10-2016-0117799 | 10/2016 |
| KR | 10-2016-0144912 | 12/2016 |
| KR | 10-2018-0062271 | 6/2018 |
| KR | 10-2018-0079091 | 7/2018 |
| KR | 10-1910111 | 10/2018 |
| KR | 20190001864 | 1/2019 |
| KR | 10-1958802 | 3/2019 |
| KR | 10-2019-0078994 | 7/2019 |
| KR | 10-2019-0116592 | 10/2019 |
| KR | 20190130700 | 11/2019 |
| TW | 201435670 | 9/2014 |

OTHER PUBLICATIONS

Chinese Office Action dated Jun. 4, 2023 issued in Application No. 202080091257.6.
U.S. Office Action dated May 10, 2023 issued in U.S. Appl. No. 17/786,639.
Korean Office Action dated May 27, 2024 issued in Application No. 10-2019-0177882.
Chinese Office Action dated Jul. 26, 2024 issued in Application No. 202080091257.6.
U.S. Office Action dated Jun. 27, 2024 issued in U.S. Appl. No. 18/385,719.

* cited by examiner

100

FOLDABLE DISPLAY DEVICE

CROSS-REFERENCE TO RELATED PATENT APPLICATIONS

This application is a Continuation of U.S. application Ser. No. 18/385,719, filed Oct. 31, 2023, now U.S. Pat. No. 12,228,972 B2, which is a Continuation of U.S. application Ser. No. 17/786,639, filed Jun. 17, 2022, now U.S. Pat. No. 11,841,746 B2, which is a U.S. National Stage Application under 35 U.S.C. § 371 of PCT Application No. PCT/KR2020/018441, filed Dec. 16, 2020, which claims priority to Korean Patent Application No. 10-2019-0177882, filed Dec. 30, 2019, whose entire disclosures are hereby incorporated by reference.

TECHNICAL FIELD

An embodiment relates to a display device including a substrate for a foldable or flexible display.

BACKGROUND ART

Recently, there is an increasing demand for a flexible or foldable display device capable of easily carrying various applications and displaying an image on a large screen when being carried.

Such a flexible or foldable display device is folded or partially bent when being carried or stored, and may be implemented with the display unfolded when displaying images. Accordingly, an image display area may be increased, and a user may easily carry the display.

After the flexible or foldable display device is folded or bent, a restoration process of unfolding the flexible display device again may be repeated.

That is, since the flexible or foldable display device repeats folding and unfolding operations, the substrate of the flexible display device is required to have a certain strength and elasticity, and cracks and deformations should not occur in the substrate during folding and restoring.

Meanwhile, the substrate for display which is elastic member constituting a flexible or foldable display device generally uses a metal substrate.

Accordingly, the substrate for display including the metal may be subjected to compressive and tensile stresses in the folding region as folding and unfolding are repeated, and thus, cracks may occur in the folding region, thereby reducing reliability.

Accordingly, it is possible to prevent such cracks by forming grooves for dispersing stress in the substrate for display. However, when the substrate for display and a panel such as a display panel are adhered, a groove formed in the substrate for display may be transferred to the display panel and visually recognized. To prevent this, an additional layer may be disposed between the substrate for display and the display panel.

Accordingly, the thickness of the substrate for display may be increased by disposing the additional layer. Accordingly, the size of the radius of curvature (R) of the substrate for display may be reduced, and thus the folding size may be reduced.

Therefore, there is a need for the substrate for display having a new structure that can ensure the reliability of the substrate for display and can be implemented with a thin thickness to have a small radius of curvature for folding.

DISCLOSURE

Technical Problem

An embodiment is to provide a foldable display device having a thin thickness and can implement a small radius of curvature.

Technical Solution

A display device according to an embodiment an elastic member; and panel disposed on the elastic member, wherein the panel includes at least one of a display panel and a touch panel, wherein the elastic member includes one surface and the other surface opposite to the one surface, and the elastic member includes a first area and a second area. wherein the first area is defined as a folding area, the second area is defined as an unfolding area, and a plurality of first grooves are disposed on the one surface in the first area of the elastic member, and the panel is disposed on the other surface of the elastic member through an adhesive layer.

Advantageous Effects

The display device according to the embodiment may include a substrate for display including a groove formed on only one surface, that is, an elastic member, and the display panel may be disposed on the other surface opposite to the one surface, that is, on the other surface in which the groove is not formed.

Accordingly, as the display panel is disposed on the other surface of the elastic member on which the pattern is not formed, visibility of the display device may be improved, and thickness may be reduced.

In detail, as the display panel is disposed on the other surface of the elastic member on which the pattern is not formed, it is possible to prevent a pattern such as a groove formed in the elastic member from being transferred to the display panel and being visually recognized.

Also, the display panel is disposed directly through an adhesive layer on the other surface of the elastic member on which the pattern is not formed, that is, on the metal substrate. Accordingly, a separate heat dissipation layer is not disposed between the display panel and the display substrate in order to dissipate heat generated from the display panel.

That is, since the other surface of the elastic member directly serves as a heat dissipation substrate, a separate additional substrate for dissipating heat is not required.

Accordingly, it is possible to reduce the overall thickness of the display device.

In addition, as described above, a separate additional layer is not required to prevent a pattern such as a groove formed in the elastic member from being transferred and visually recognized by the display panel. Accordingly, it is possible to reduce the overall thickness of the display device.

Accordingly, the overall thickness of the display device is reduced. Accordingly, it is possible to reduce the weight of the display device and to improve the folding characteristics.

3

4

Figure 3:
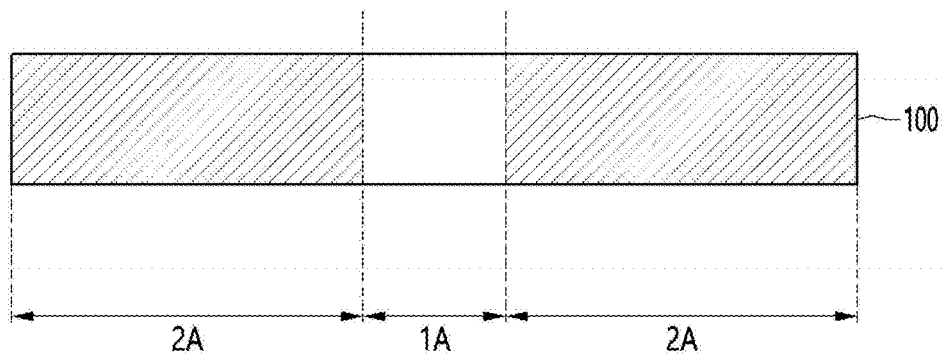

FIG. 3 is a side view of the elastic member before folding according to an embodiment.

Figure 4:
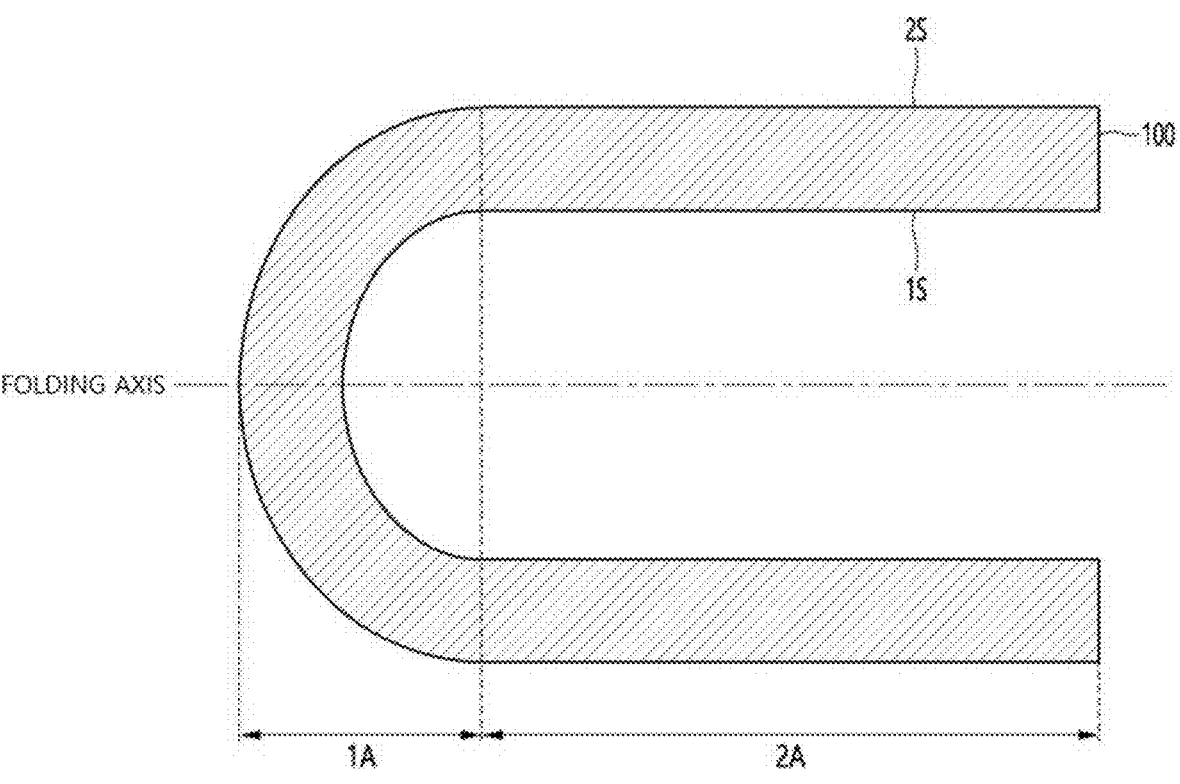

FIG. 4 is a side view of the elastic member after folding according to an embodiment.

Figure 5:
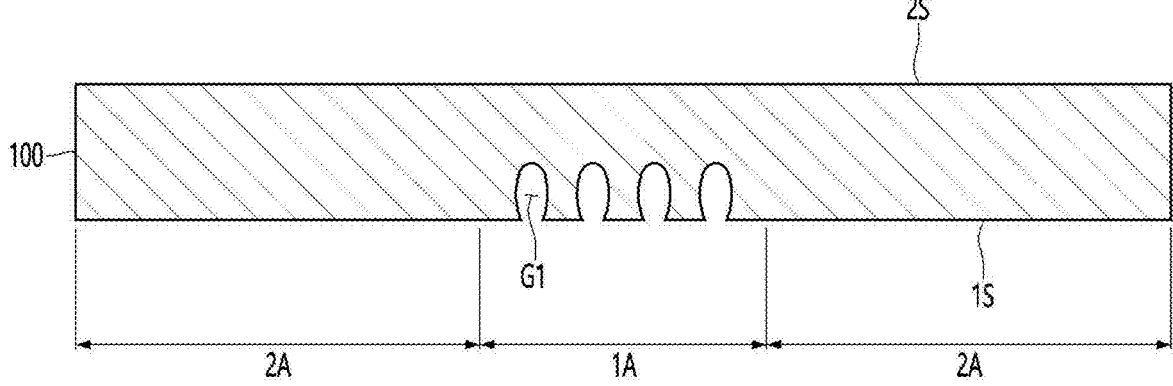

FIG. 5 is a cross-sectional view of the elastic member according to the embodiment.

Figure 6:
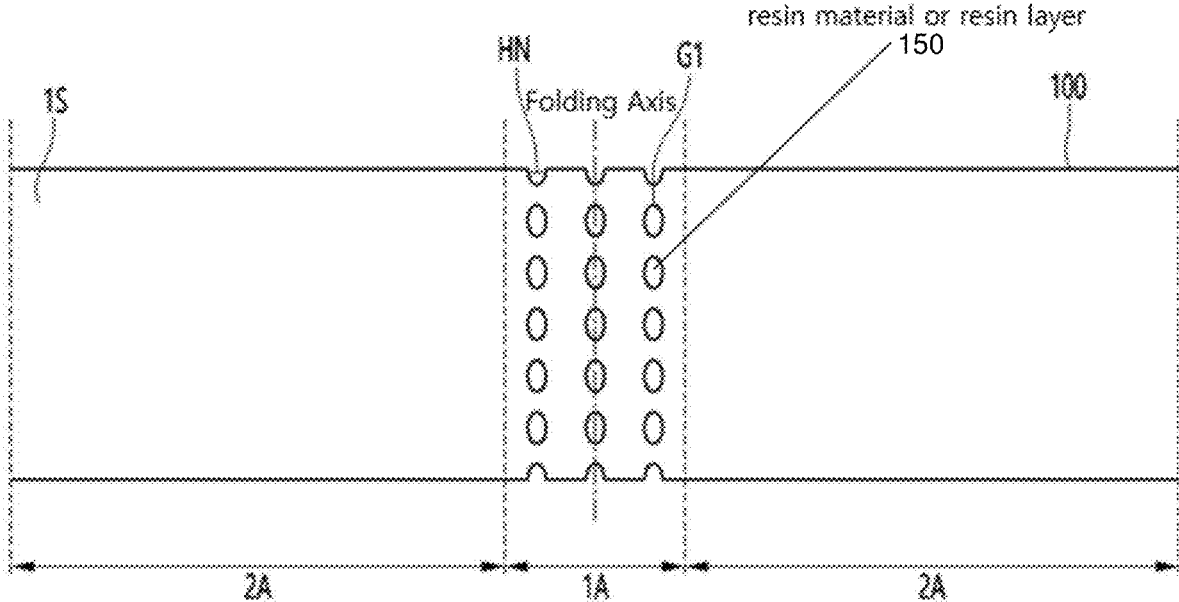

FIG. 6 is a top view of one surface of the elastic member according to the embodiment.

Figure 7:
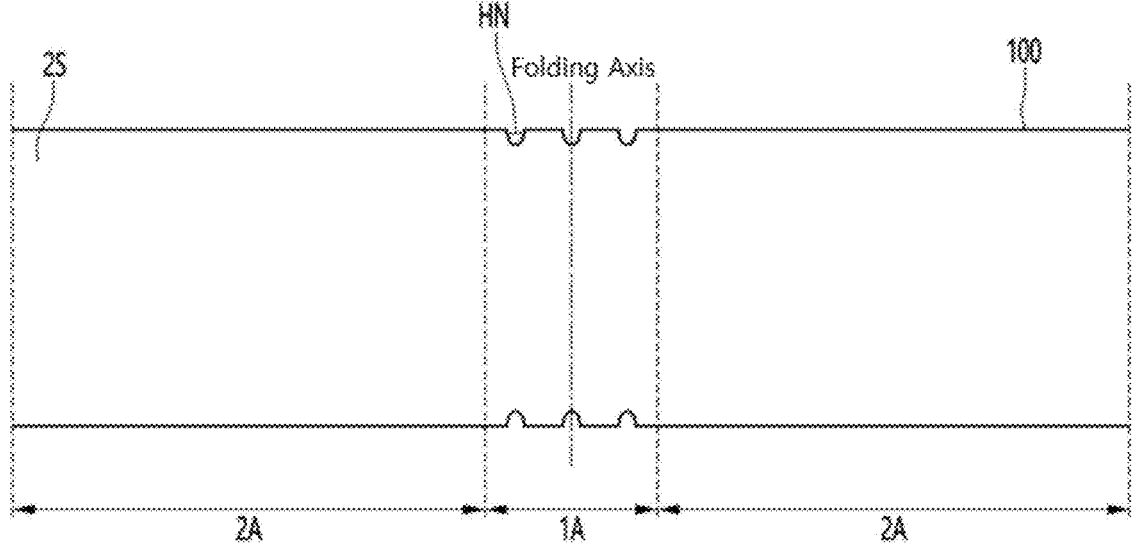

FIG. 7 is a top view of the other surface of the elastic member according to the embodiment.

Figure 8:
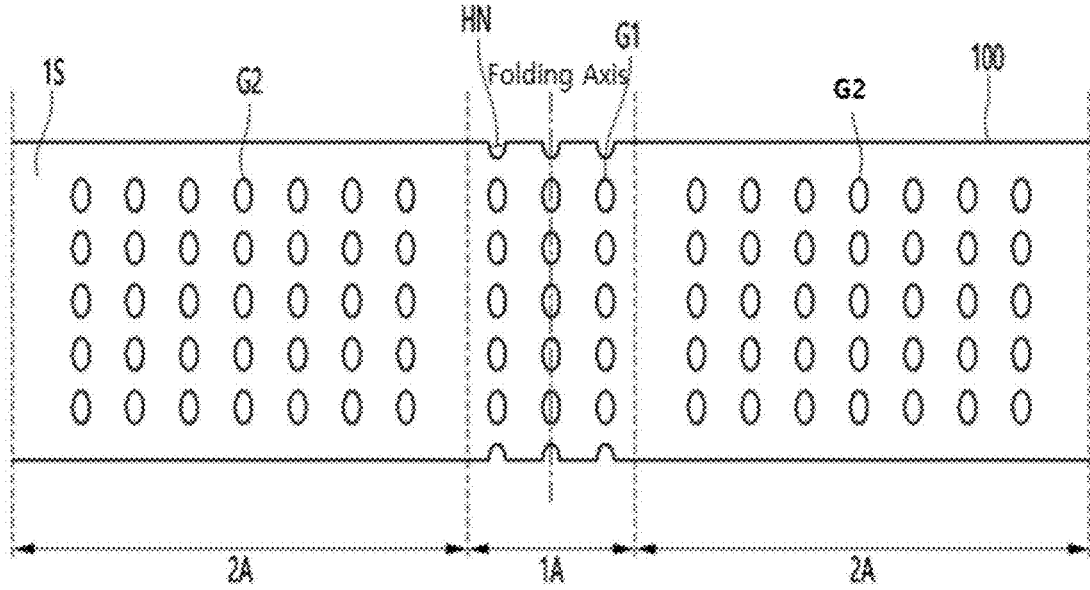

FIG. 8 is another top view of one surface of the elastic member according to the embodiment.

Figure 9:
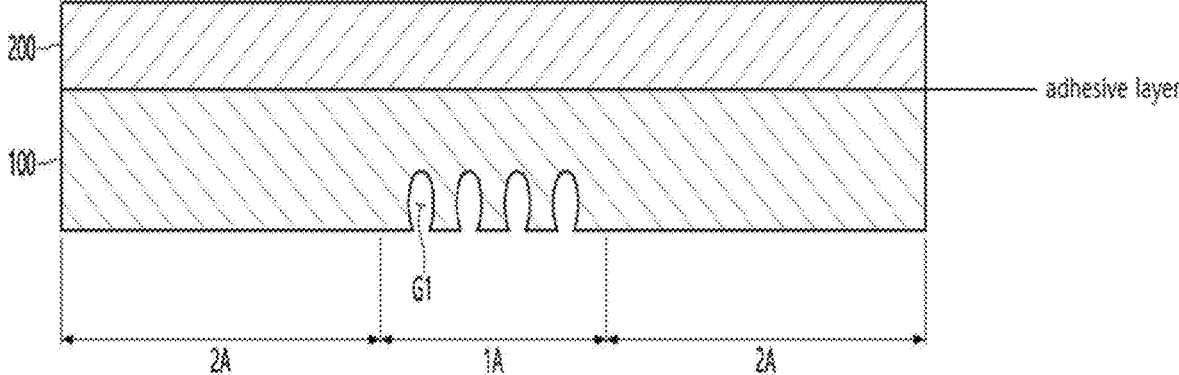

FIG. 9 is a cross-sectional view of the display device including the elastic member according to the embodiment.

Figure 10:
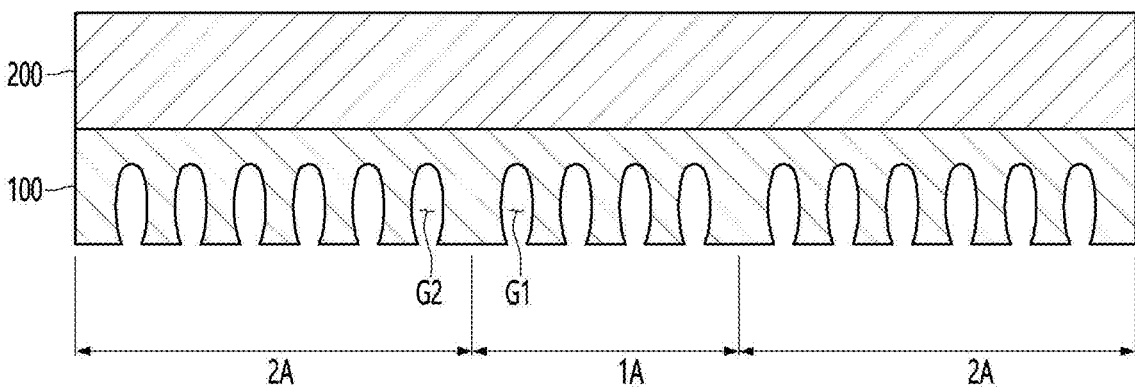

FIG. 10 is another cross-sectional view of the display device including the elastic member according to the embodiment.

Figure 11:
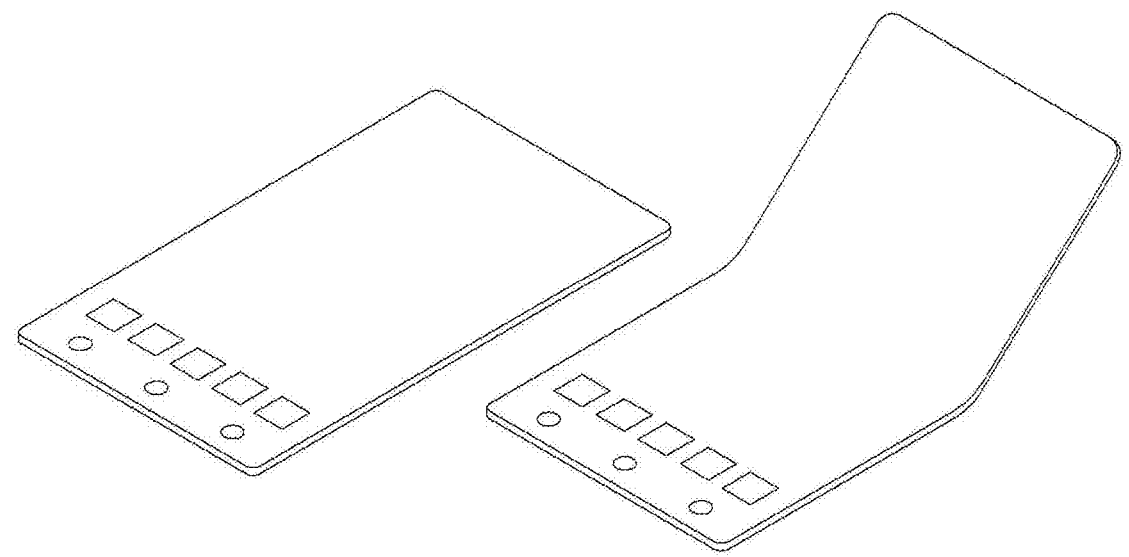

FIG. 11 is a view for describing an example in which the device for display according to an embodiment is applied.

MODES OF THE INVENTION

Hereinafter, embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced.

In addition, unless expressly otherwise defined and described, the terms used in the embodiments of the present invention (including technical and scientific terms) may be construed the same meaning as commonly understood by one of ordinary skill in the art to which this invention belongs, and the terms such as those defined in commonly used dictionaries may be interpreted as having a meaning that is consistent with their meaning in the context of the relevant art.

In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C".

Further, in describing the elements of the embodiments of the present invention, the terms such as first, second, A, B, (a), and (b) may be used. These terms are only used to distinguish the elements from other elements, and the terms are not limited to the essence, order, or order of the elements.

In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements.

Further, when described as being formed or disposed "on (over)" or "under (below)" of each element, the "on (over)" or "under (below)" may include not only when two elements are directly connected to each other, but also when one or more other elements are formed or disposed between two elements.

Furthermore, when expressed as "on (over)" or "under (below)", it may include not only the upper direction but also the lower direction based on one element.

Hereinafter, an elastic member according to an embodiment will be described with reference to drawings.

Figure 1:
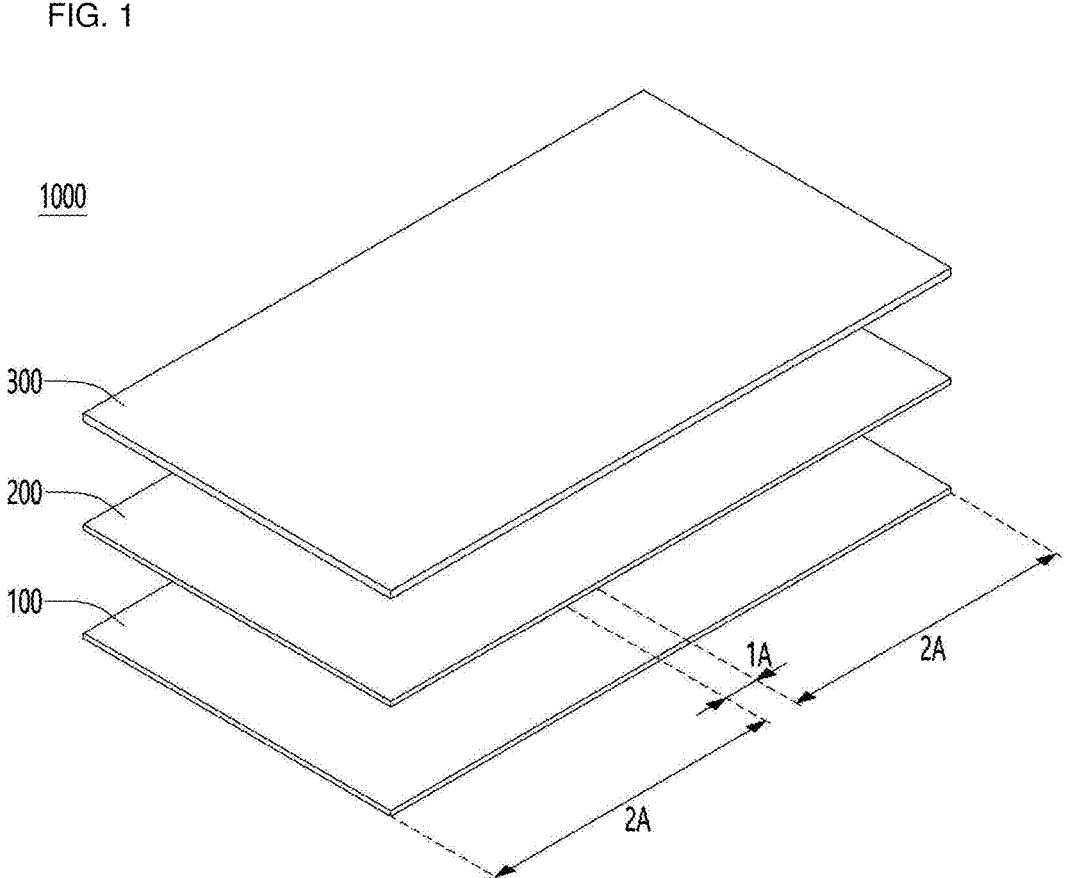
FIG. 1 is a perspective view of a flexible display device according to an embodiment.

FIG. 1 is perspective views of a flexible or foldable display device according to an embodiment.

Referring to FIG. 1, a flexible or foldable display device 1000 according to an embodiment may include an elastic member 100, a display panel 200 disposed on the elastic member 100, and a touch panel 300 disposed on the display panel 200.

The elastic member 100 may support the display panel 200 and the touch panel 300. That is, the elastic member 100 may be a support substrate supporting the display panel 200 and the touch panel 300.

The elastic member 100 may include a material such as metal. For example, the elastic member 100 may include metal, metal alloy, plastic, a composite material (e.g., carbon fiber reinforced plastic, a magnetic or conductive material, a glass fiber reinforced material, etc.), ceramic, sapphire, glass, and the like.

The elastic member 100 may be flexible or foldable. That is, the elastic member 100 may be folded or bent in one direction. That is, the elastic member 100 may be a substrate for display applied to a flexible display device or a foldable display device.

The elastic member 100 may include at least two areas. In detail, the elastic member 100 may include a first area (or first region) 1A and a second area (or second region) 2A.

The first area 1A may be defined as an area where the elastic member 100 is folded. That is, the first area 1A may be a folding area.

In addition, the second area 2A may be defined as an area where the elastic member 100 is not folded. That is, the second area 2A may be an unfolding area.

The first area 1A and the second area 2A will be described in detail below.

The display panel 200 may be disposed above the elastic member 100.

The display panel 200 may include a plurality of pixels including a switching thin film transistor, a driving thin film transistor, a power storage device, and an organic light-emitting diode (OLED). In case of the OLED, deposition may be performed at a relatively low temperature, and the OLED may be mainly applied to a flexible display device for reasons such as low power and high luminance. Here, a pixel refers to a minimum unit for displaying an image, and the display panel displays an image through a plurality of pixels.

The display panel may include a substrate, a gate line disposed on the substrate, a data line crossing with the gate line in isolation, and a common power line. In general, one pixel may be defined by the gate line, the data line, and the common power line as a boundary.

The substrate may include a material having flexible properties such as a plastic film, and the display panel 200 may be implemented by disposing an organic light-emitting diode and a pixel circuit on a flexible film.

The touch panel 300 may be disposed above the display panel 200. The touch panel 300 may implement a touch function in the flexible display device, and the touch panel may be omitted in the foldable display device that simply displays an image without the touch function.

The touch panel 300 may include a substrate and a touch electrode disposed on the substrate. The touch electrode may sense a position of an input device that is touched on the flexible display device using a capacitance type or a resistive film type.

The substrate of the touch panel 300 may include a material having flexible properties such as a plastic film, and the touch panel 300 may be implemented by disposing the touch electrode on the flexible film.

Meanwhile, the elastic member 100 and the display panel 200 may have different sizes.

For example, the area of the elastic member 100 may be 90% or more to 110% or less of the area of the display panel 200. In detail, the area of the elastic member 100 may be 95% or more to 105% or less of the area of the display panel 200. In more detail, the area of the elastic member 100 may be 97% or more to 100% or less of the area of the display panel 200.

When the area of the elastic member 100 is 90% or less of the area of the display panel 200, the supporting force of the elastic member 100 to support the display panel 200 or the touch panel 300 may be reduced. Accordingly, a curl may occur in the unfolding area of the elastic member 100. Accordingly, when the user visually recognizes the screen area, visibility may decrease. Also, when the touch is driven, a touch malfunction may occur because the screen of the touch area is incomplete due to the curl area.

An addition, when the area of the elastic member 100 increases to 110% or more of the area of the display panel 200, a supporting force for supporting the display panel or the touch panel by the elastic member 100 may be secured. However, a bezel area of a display device including the substrate, the display panel, and the touch panel may increase. As a result, the screen area effective to the user is narrowed, which may be inconvenient when using the display device.

In addition, the area of the first region 1A of the elastic member 100 may be 1% or more to 30% or less of the total area of the elastic member 100. In detail, the area of the first region 1A of the elastic member 100 may be 5% or more to 20% or less of the total area of the elastic member 100. An area of the first region 1A of the elastic member 100 may be 10% or more to 15% or less of the total area of the elastic member 100.

When the area of the first region 1A of the elastic member 100 is 1% or less of the total area of the elastic member 100, when folding and restoring the elastic member is repeated, cracks may occur at the boundary of the folding area and the unfolding area. Accordingly, folding reliability of the elastic member 100 may be reduced.

In addition, when the area of the first region 1A of the elastic member 100 exceeds 30% of the total area of the elastic member 100, when the elastic member is folded, curl may occur in the folding area in the display panel 200. Accordingly, when the user visually recognizes the screen area, visibility may decrease. Also, when the touch is driven, a touch malfunction may occur because the screen of the touch area is incomplete due to the curl area Meanwhile, although not shown in the drawings, a cover window for protecting the flexible display device may be additionally disposed on the touch panel 300 or on the display panel 200 (when the touch panel is omitted).

As described above, the flexible display device includes the elastic member 100.

Figure 2:
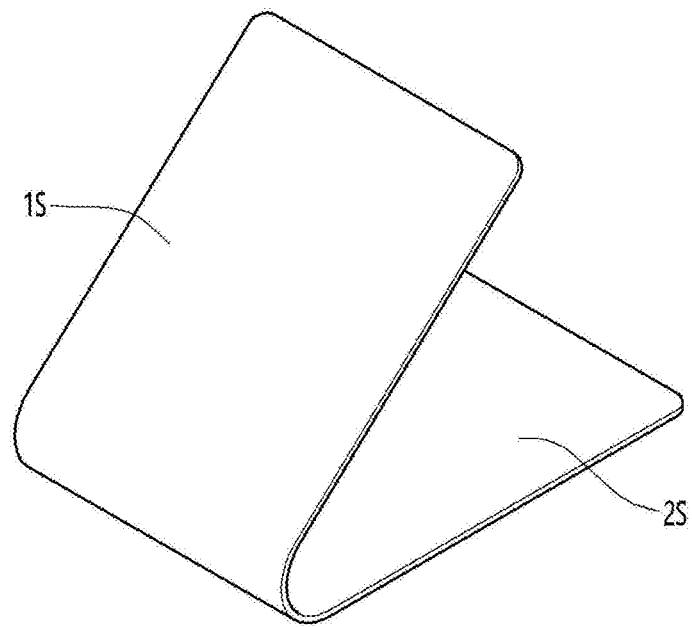
FIG. 2 is a perspective view of an elastic member according to an embodiment.

Referring to FIG. 2, the elastic member 100 may be bent in one direction.

In detail, the elastic member 100 may include one surface 1S and the other surface 2S opposite to the one surface 1S.

In the elastic member 100, the one surface 1S or the other surface 2S may be bent to face each other.

In the following description, as shown in FIG. 2, it will be mainly described that the one surfaces 1S are bent in a direction facing each other in the elastic member 100.

As described above, the first area 1A and the second area 2A may be defined in the elastic member 100. The first area 1A and the second area 2A may be areas defined when the one surfaces 1S are bent in the direction facing each other in the elastic member 100.

In detail, the elastic member 100 is bent in one direction, and the elastic member 100 may be divided into the first area 1A which is a folded area (folding area) and the second area 2A which is an unfolded area (unfolding area).

Referring to FIG. 3 and FIG. 4, the elastic member 100 may include the first area 1A that is an area where the elastic member 100 is bent. The elastic member 100 may include the second area 2A that is not bent and is disposed adjacent to the first area 1A.

For example, the second area 2A may be formed on the left side and the right side of the first area 1A based on the direction in which the elastic member 100 is bent. That is, the second area 2A may be disposed at both ends of the first area 1A. That is, the first area 1A may be disposed between the second areas 2A.

The first area 1A and the second area 2A may be formed on the same elastic member 100. That is, the first area 1A and the second area 2A may be formed integrally with each other without being separated on the same elastic member 100.

Sizes of the first area 1A and the second area 2A may be different from each other. In detail, the size of the second area 2A may be larger than the size of the first area 1A.

In the drawings, it is illustrated that the first area 1A is positioned in a central portion of the elastic member 100, but the embodiment is not limited thereto. That is, the first area 1A may be positioned in one end and an end area of the elastic member 100. That is, the first area 1A may be positioned at one end and the end area of the elastic member 100 such that the size of the second area 2A is asymmetric.

FIG. 4 is a side view of the elastic member for display after the elastic member is folded.

Referring to FIG. 4, the elastic member 100 may be folded in one direction around a folding axis. In detail, the one surface 1S may be folded in a direction facing each other along the folding axis.

As the elastic member 100 is folded in one direction, the first area 1A and the second area 2A may be formed on the elastic member 100. That is, the folding area formed by folding the elastic member 100 in one direction and the unfolding area positioned at both ends of the folding area may be formed in the elastic member 100.

The folding area may be defined as an area where a curvature R is formed, and the unfolded area may be defined as an area where the curvature R is not formed or the curvature is close to zero.

Referring to FIGS. 3 and 4, the elastic member 100 may be folded in one direction to be formed in an order of the unfolding area, the folding area, and the unfolding area.

A plurality of pattern may be formed in at least one of the first area 1A and the second area 2A to control and disperse stress generated when the elastic member 100 is folded.

FIGS. 5 to 7 are views for explaining the elastic member and display device according to the first embodiment.

FIG. 5 is a view a cross-sectional view of the elastic member according to the embodiment. Referring to FIG. 5, the elastic member 100 may include one surface 1S and the other surface 2S opposite to the one surface 1S.

The elastic member 100 may include any one of Stainless Steel (SUS), copper, titanium, aluminum, and alloys thereof.

A pattern may be formed on any one of the one surface 1S and the other surface 2S of the elastic member 100. In detail, a groove-shaped pattern may be formed on any one of the one surface 1S and the other surface 2S of the elastic member 100.

For example, referring to FIG. 5, a plurality of grooves G may be formed on one surface 1S of the elastic member 100. In detail, the elastic member 100 may extend in a direction from the one surface 1S to the other surface 2S, and first grooves G1 that do not penetrate through the other surface may be formed.

That is, the plurality of first grooves G1 formed in the elastic member 100 may be formed to partially penetrate the elastic member 100. That is, the first groove G1 may pass through one surface 1S of the elastic member 100 and not penetrate the other surface 2S. The groove G may be formed to have a depth smaller than the thickness T of the elastic member 100.

For example, the total thickness of the elastic member 100 may be about 1 mm. In detail, the thickness of the elastic member 100 may be 0.05 mm to 1.5 mm. When the thickness of the elastic member 100 is less than 0.05 mm, the strength of the elastic member 100 may be reduced, and when the thickness of the elastic member 100 exceeds 1.5 mm, folded properties of the elastic member 100 may be reduced.

In this case, the first groove G1 may be formed to have a depth smaller than the thickness of the elastic member 100 having the thickness range.

For example, the depth of the first groove G1 may be ⅟₅₀ to ⅔ of the thickness of the elastic member 100.

When the depth of the first groove G1 is less than ⅟₅₀ of the thickness of the elastic member, the stress cannot be sufficiently distributed by the groove G when the display device is folded. Accordingly, the folding characteristic of the display device may be reduced.

In addition, when the depth of the first groove G1 exceeds ⅔ of the thickness of the elastic member, the overall stress of the elastic member 100 becomes non-uniform due to the groove G. Accordingly, warpage may occur in the elastic member.

The first groove G1 formed in the elastic member 100 may distribute the stress caused by the folding when the elastic member is folded or restored. Accordingly, it is possible to prevent deformation of the elastic member due to stress generated when the elastic member is folded or restored.

Meanwhile, the first groove G1 may be filled with a resin material 150. In detail, a resin material 150 such as silicone may be filled in the first groove G1 formed in the elastic member 100.

The resin material may be disposed only inside the first groove G1. Alternatively, the resin material may be disposed on one surface 1S of the elastic member 100 while filling the first groove G1 and may be disposed as a resin layer.

The resin material may prevent foreign substances from being introduced into the groove formed in the elastic member, and may smooth the surface of the elastic member 100 in which the groove is formed. In addition, since the shape of the groove can be maintained, it is possible to prevent reduction in folding characteristics due to shape deformation.

Hereinafter, an elastic member according to an embodiment will be described in detail with reference to FIGS. 6 to 8.

FIGS. 6 and 7 are views showing top views of one surface and the other surface of the elastic member according to the embodiment.

That is, FIG. 6 is a view showing a top view of one surface 1S of the elastic member, which is the outer surface of the folding, when the elastic member 100 is folded. In addition, FIG. 7 is a view showing a top view of the other surface 2S of the elastic member, which is the inner surface of the folding, when the elastic member 100 is folded.

Referring to FIG. 6, a plurality of grooves formed by partially etching the elastic member 100 may be formed in the elastic member. In detail, a first groove G1 formed by partially penetrating the elastic member 100 is formed on one surface 1S of the elastic member 100. Accordingly, a plurality of grooves may be formed in the elastic member as a whole.

In detail, a first groove G1 may be formed in the first area 1A of the elastic member 100. In detail, a plurality of first grooves G1 may be formed in the first area 1A of the elastic member 100 to be spaced apart from each other. 6 shows only the three first grooves G1 formed in the first area 1A, but this is for convenience of description, four or more first grooves G1 may be formed in the first area 1A.

The plurality of first grooves G1 formed in the first area 1A serves to distribute stress generated when the first area is folded. In detail, the first area 1A of the elastic member may be deformed or damaged due to the compressive stress generated when the elastic member 100 is folded.

Accordingly, by forming the first groove G1 in the first area 1A, it is possible to prevent stress from being concentrated in a specific region of the first area 1A. Accordingly, it is possible to prevent damage to the elastic member by the compressive stress generated when the elastic member 100 is folded.

The first groove G1 may be formed in various sizes according to the desired radius of curvature and reliability. In detail, the first groove G1 may be formed to have a short directional width of 10 μm to 500 μm and a long direction width of 100 μm to 10000 μm, depending on the desired folding characteristics, that is, the size of the radius of curvature and reliability.

Here, the short directional width may be defined as the width of the opening surface of the first groove G1 formed on one surface 1S of the elastic member. In addition, the long direction width may be defined as a length of the first groove G1 on one surface 1S of the elastic member.

The first grooves G1 may be formed in a regular pattern in the first area 1A, or the first grooves G1 may be formed in an irregular pattern in the first area 1A.

The first groove G1 may be formed to have a curved surface. In detail, the first groove G1 may be formed in a shape having a curved surface, such as an elliptical shape, a hemispherical shape, or a circular shape.

However, the embodiment is not limited thereto, and the first groove G1 may be formed in a polygonal shape such as a triangle or a square.

Meanwhile, the first groove G1 may be filled with a resin material 150. In detail, a resin material 150 such as silicone may be filled in the first groove G1 formed on one surface 1S of the elastic member 100.

Referring to FIG. 7, a separate groove pattern may not be formed on the other surface 2S of the elastic member 100. In detail, the other surface 2S of the elastic member 100 may be formed as a flat surface.

That is, the other surface 2S of the elastic member 100 may be exposed to the outside. That is, the other surface 2S of the elastic member 100 including the metal is exposed to the outside, and the display panel and/or the touch panel coupled to the elastic member may be disposed in direct contact with the other surface 2S of the elastic member 100 through an adhesive layer.

Meanwhile, the first area 1A and the second area 2A may be divided according to whether or not a hinge part is formed. That is, the folding area and the unfolding area may be divided according to whether or not the hinge part is formed.

In detail, a plurality of hinge parts may be formed in the first area 1A, and no hinge parts may be formed in the second area 2A.

That is, the folding region may be defined as a region in which the hinge part HN is formed.

The hinge part HN may be defined as a point at which folding starts in the elastic member 100. That is, the elastic member may start folding from the hinge parts at both ends of the plurality of hinge parts.

The hinge part HN may include a plurality of hinge parts according to the folding shape of the elastic member 100. The hinge part HN may be formed at both ends of the elastic member 100 overlapping the short direction in which the first grooves G1 are formed based on the short direction length of the elastic member 100 in the width direction.

Accordingly, when the elastic member 100 is folded by the hinge part HN. the folding area can be easily folded.

The hinge part HN may be formed through one surface and the other surface of the short direction area among the end areas of the elastic member 100. That is, the hinge part HN may be defined as a hole in which both end areas in the short direction among the end areas of the elastic member 100 are penetrated.

The shape of the hinge part HN may be the same as or different from the shape and size of the first groove. For example, the hinge part may be formed while having a curved surface. In detail, the hinge part may be formed in a shape having a curved surface, such as an elliptical shape, a hemispherical shape, or a circular shape.

However, the embodiment is not limited thereto, and the hinge portion may be formed in a polygonal shape such as a triangle or a quadrangle or an oval shape.

Meanwhile, referring to FIG. 8, grooves may be formed in the entire area of the elastic member.

FIG. 8 is another cross-sectional view of the elastic member according to the first embodiment.

Referring to FIG. 8, grooves may be formed in both the first area 1A and the second area 2A in the elastic member. In detail, a second groove G2 may also be formed in the second area 2A defined as an unfolding area. That is, holes may be formed in the entire area of the elastic member.

A plurality of second grooves G2 spaced apart from each other may be formed in the second area 2A. The groove G2 may be formed through the elastic member 100. In detail, the second groove G2 may be formed through one surface 1S of the elastic member and not through the other surface 2S.

Meanwhile, the second groove G2 may also be filled with a resin material 150. In detail, a resin material such as silicone may be filled inside the second groove G2 formed on one surface 1S of the elastic member.

Due to the second groove G2 formed in the second area 2A, a difference in deformation between the first area 1A and the second area 2A according to heat may be reduced.

In detail, by forming grooves in both the first area 1A and the second area 2A, the difference between the deformation due to heat in the first area 1A and the deformation due to heat in the second area 2A may be reduced. Accordingly, it is possible to prevent the elastic member from being bent or distorted.

The second groove G2 may be formed in various sizes according to the desired radius of curvature and reliability. In detail, the second groove G2 may be formed to have a short directional width of 10 μm to 500 μm and a long direction width of 100 μm to 10000 μm, depending on the desired folding characteristics, that is, the size of the radius of curvature and reliability.

The second grooves G2 may be formed in a regular pattern in the second area 2A, or the second grooves G2 may be formed in an irregular pattern in the second area 2A.

The second groove G2 may be formed to have a curved surface. In detail, the second groove G2 may be formed in a shape having a curved surface, such as an elliptical shape, a hemispherical shape, or a circular shape.

However, the embodiment is not limited thereto, and the second groove G2 may be formed in a polygonal shape such as a triangle or a square.

Meanwhile, the second grooves G2 disposed in the second area 2A may have different densities for each area.

In detail, as the distance from the folding axis of the elastic member 100 increases, that is, toward the outer region of the elastic member, the density of the second groove G2 may decrease.

In detail, the size of the second groove G2 may gradually decrease as it moves away from the folding axis of the elastic member 100.

Alternatively, as the second groove G2 moves away from the folding axis of the elastic member 100, the interval between the adjacent second grooves G2 may gradually increase.

That is, the density of the second groove G2 formed in the second area 2A, which is the unfolding region, may decrease as the distance from the folding axis increases.

Accordingly, stress generated when the elastic member 100 is folded and restored can be effectively dispersed from the folding axis of the elastic member 100 toward the outer portion. Accordingly, the reliability of the elastic member may be improved.

Hereinafter, a display device including the aforementioned elastic member 100 and the display panel 200 disposed on the elastic member 100 will be described with reference to FIGS. 9 and 10.

Referring to FIGS. 9 and 10, the display device according to the embodiment includes an elastic member 100 and a display panel 200 disposed on the elastic member 100.

The display panel 200 may be disposed on the other surface of the elastic member 100. That is, the display panel 200 may be disposed on the other surface of the elastic member on which the grooves are not formed.

Accordingly, the display panel 200 may be disposed on the other surface of the flat elastic member 100 on which a groove-shaped pattern is not formed among one surface and the other surfaces of the elastic member 100.

The elastic member 100 and the display panel 200 may be adhered to each other through an adhesive layer bonding them.

Meanwhile, the touch panel 300 may be further disposed on the elastic member 100, and at least one of the display panel 200 and the touch panel 300 may be disposed on the elastic member 100.

As the display panel 200 is disposed on the other surface of the elastic member 100 on which the pattern is not formed, visibility of the display device may be improved and the thickness may be reduced.

In detail, as the display panel is disposed on the other surface of the elastic member on which the pattern is not formed, it is possible to prevent a pattern such as a groove formed in the elastic member from being transferred to the display panel and being visually recognized.

Also, the display panel is disposed directly through an adhesive layer on the other surface of the elastic member on which the pattern is not formed, that is, on the metal substrate. Accordingly, a separate heat dissipation layer is not disposed between the display panel and the display substrate in order to dissipate heat generated from the display panel.

That is, since the other surface of the elastic member directly serves as a heat dissipation substrate, a separate additional substrate for dissipating heat is not required.

Accordingly, it is possible to reduce the overall thickness of the display device.

In addition, as described above, a separate additional layer is not required to prevent a pattern such as a groove formed in the elastic member from being transferred and visually recognized by the display panel. Accordingly, it is possible to reduce the overall thickness of the display device.

Accordingly, the overall thickness of the display device is reduced. Accordingly, it is possible to reduce the weight of the display device and to improve the folding characteristics FIG. 11 is a view for describing an example in which a elastic member according to embodiments is applied.

Referring to FIG. 11, the elastic member according to the embodiments may be applied to a flexible display device that displays a display.

For example, the elastic member according to the embodiments may be applied to a flexible display device such as a mobile phone or a tablet.

Such the elastic member may be applied to flexible display devices such as a mobile phone, a tablet, and the like that are flexible, bent or folded.

The elastic member is applied to the flexible display devices such as the mobile phone, the tablet, and the like that are flexible, bent or folded and may improve the reliability of the flexible display device by improving the folding reliability in the display device that is repeatedly folded or restored.

The characteristics, structures, effects, and the like described in the above-described embodiments are included in at least one embodiment of the present invention, but are not limited to only one embodiment. Furthermore, the characteristic, structure, and effect illustrated in each embodiment may be combined or modified for other embodiments by a person skilled in the art. Accordingly, it is to be understood that such combination and modification are included in the scope of the present invention.

In addition, embodiments are mostly described above, but the embodiments are merely examples and do not limit the present invention, and a person skilled in the art may appreciate that several variations and applications not presented above may be made without departing from the essential characteristic of embodiments. For example, each component specifically represented in the embodiments may be varied. In addition, it should be construed that differences related to such a variation and such an application are included in the scope of the present invention defined in the following claims.

The invention claimed is:

1. An elastic member comprising:
a first region; and
a second region,
wherein the second region includes a plurality of portion spaced apart from each other,
wherein the first region is disposed between the plurality of portion of the second region,
wherein a plurality first patterns are disposed in the first region,
wherein a plurality second patterns are disposed in the second region, and
wherein a size of the second patterns decreases away from a folding axis.

2. The elastic member of claim 1, wherein an interval of the second patterns increases away from the folding axis.

3. The elastic member of claim 1, wherein a plurality of hinge portions are disposed on the first region,
wherein one of the hinge portions is formed with both ends in a width direction penetrating, and
wherein the first patterns and the hinge portions overlap in the width direction.

4. The elastic member of claim 1, wherein a resin material is disposed inside at least one of the first patterns or the second patterns.

5. The elastic member of claim 1, wherein at least one of the first patterns or the second patterns has a width in a longitudinal direction greater than a width in a width direction.

6. The elastic member of claim 1, wherein a width of the first patterns and the second patterns in a width direction is 10 µm to 500 µm.

7. The elastic member of claim 1, wherein the first patterns and the folding axis overlap in a width direction.

8. The elastic member of claim 1, wherein one of the first patterns adjacent to each other overlap in a longitudinal direction.

9. The elastic member of claim 1, wherein one of the second patterns adjacent to each other overlap in a longitudinal direction.

10. The elastic member of claim 1, wherein the first region is folded.

11. An elastic member comprising:
a first surface and a second surface opposite the first surface; and
a first region and a second region,
wherein the second region includes a plurality of portion spaced apart from each other,
wherein the first region is disposed between the plurality of portion of the second region,
wherein a plurality first patterns are disposed in the first region,
wherein a plurality second patterns are disposed in the second region, and
wherein a density of the second patterns decreases away from a folding axis.

12. The elastic member of claim 11, wherein the first surface is a folding outer surface, and the second surface is the folding inner surface.

13. The elastic member of claim 11, wherein the second patterns include a groove formed on the first surface, and
wherein a depth of the second pattern is less than 50% of a thickness of the elastic member.

14. The elastic member of claim 11, wherein the second patterns include a groove formed on the first surface, and
wherein a depth of the second pattern is 50% or more of a thickness of the elastic member.

* * * * *